United States Patent
Hayashi et al.

(10) Patent No.: US 9,156,742 B2
(45) Date of Patent: Oct. 13, 2015

(54) HONEYCOMB STRUCTURAL BODY

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naohiro Hayashi, Kariya (JP); Masakazu Murata, Obu (JP); Hiroyuki Matsubara, Gifu (JP); Oji Kuno, Nagoya (JP); Hiromasa Suzuki, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/375,020

(22) PCT Filed: Jan. 22, 2013

(86) PCT No.: PCT/JP2013/051156
§ 371 (c)(1),
(2) Date: Jul. 28, 2014

(87) PCT Pub. No.: WO2013/111728
PCT Pub. Date: Aug. 1, 2013

(65) Prior Publication Data
US 2015/0004353 A1    Jan. 1, 2015

(30) Foreign Application Priority Data

Jan. 27, 2012 (JP) .................................. 2012-015738
Nov. 6, 2012 (JP) .................................. 2012-244484

(51) Int. Cl.
*B01D 46/24* (2006.01)
*F01N 3/022* (2006.01)
(Continued)

(52) U.S. Cl.
CPC .......... *C04B 38/0009* (2013.01); *B01D 46/247* (2013.01); *B01J 35/04* (2013.01);
(Continued)

(58) Field of Classification Search
None
See application file for complete search history.

(56) References Cited

U.S. PATENT DOCUMENTS 5,108,685 A    4/1992  Kragle
5,916,133 A *  6/1999  Buhrmaster et al. ............ 60/297
(Continued)

FOREIGN PATENT DOCUMENTS

CN    1346694    5/2002
JP    55-155742  12/1980
(Continued)

OTHER PUBLICATIONS

International Search Report for PCT/JP2013/051156 mailed Apr. 16, 2013.
(Continued)

*Primary Examiner* — David Sample
*Assistant Examiner* — Nicholas W Jordan
(74) *Attorney, Agent, or Firm* — Nixon & Vanderhye P.C.

(57) ABSTRACT

In a cross section, perpendicular to an axial direction of a honeycomb structural body having partition walls and cells, a plurality of sections having a different cell density is formed from a central area toward an outer peripheral area, and a partition wall is formed between the sections adjacent to each other. The boundary section has boundary partition walls and plural boundary cells having a polygonal shape different in shape from the cells in the sections formed adjacent to the boundary section. The partition walls in the sections adjacent to the boundary section are connected by the boundary partition walls. A part of the boundary cell is surrounded by at least the boundary partition walls. A relationship of $\phi1/\phi2 \geq 1.25$ is satisfied, where $\phi1$ indicates an average hydraulic diameter of the boundary cells and $\phi2$ indicates an average hydraulic diameter of the cells.

8 Claims, 12 Drawing Sheets

(51) Int. Cl.
  *C04B 38/00* (2006.01)
  *B01J 35/04* (2006.01)
  *F01N 3/28* (2006.01)
(52) U.S. Cl.
  CPC ..... *F01N 3/2828* (2013.01); *B01D 2046/2496* (2013.01); *F01N 2330/06* (2013.01); *F01N 2330/34* (2013.01); *F01N 2330/48* (2013.01); *F01N 2330/60* (2013.01); *Y10T 428/24149* (2015.01)

(56) References Cited

U.S. PATENT DOCUMENTS

| 2002/0042344 | A1 | 4/2002 | Kondo et al. |
| 2004/0101654 | A1 | 5/2004 | Hijikata |
| 2004/0131512 | A1 | 7/2004 | Abe et al. |
| 2007/0231533 | A1 | 10/2007 | Aniolek et al. |
| 2007/0294989 | A1 | 12/2007 | Ichikawa |

FOREIGN PATENT DOCUMENTS

| JP | 11-270334 | 10/1999 |
| JP | 3219292 | 8/2001 |
| JP | 2002-177794 | 6/2002 |
| JP | 2002-326035 | 11/2002 |
| JP | 2003-025316 | 1/2003 |
| JP | 2006-263947 | 10/2006 |
| JP | 2006-281134 | 10/2006 |
| JP | 2008-018370 | 1/2008 |
| JP | 4094823 | 3/2008 |
| JP | 2008-200605 | 9/2008 |
| JP | 4332847 | 7/2009 |
| JP | 2009-532605 | 9/2009 |

OTHER PUBLICATIONS

Written Opinion of the International Searching Authority for PCT/JP2013/051156 mailed Apr. 16, 2013.

International Preliminary Report on Patentability (4 pgs.) dated Aug. 7, 2014 issued in corresponding International Application No. PCT/JP2013/051156 with an at least partial English-language translation thereof (9 pgs.).

Office Action (6 pgs.) dated Jun. 25, 2015 issued in corresponding Chinese Application No. 201380006904.9 with An at least partial English-language translation (4 pgs.).

* cited by examiner

FIG.1
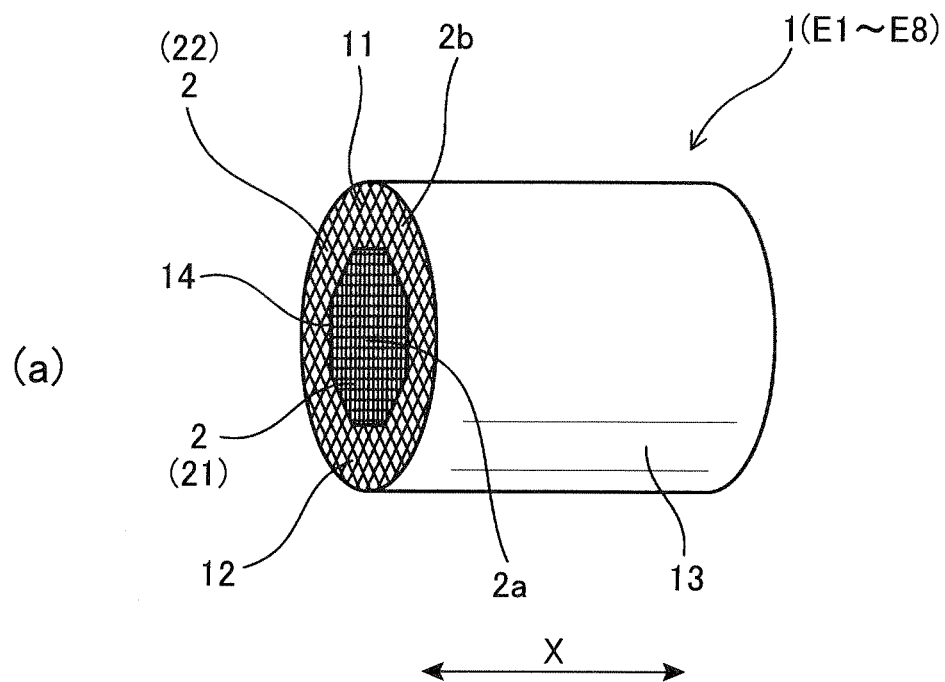
(a)
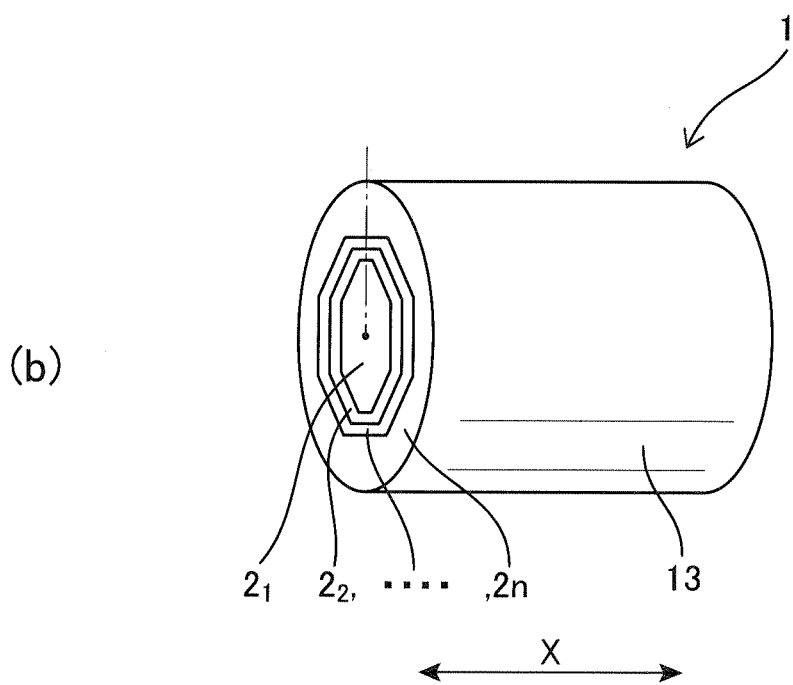
(b)

FIG.5
(a)
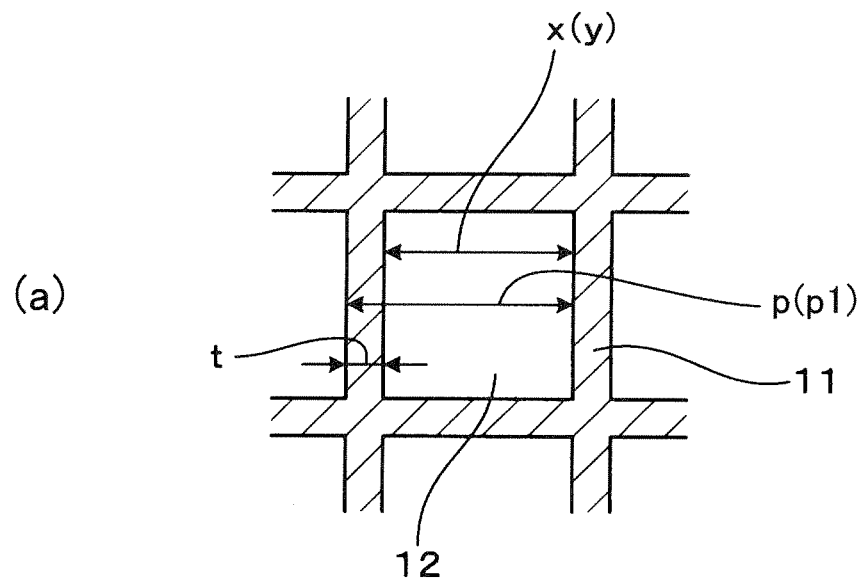
(b)
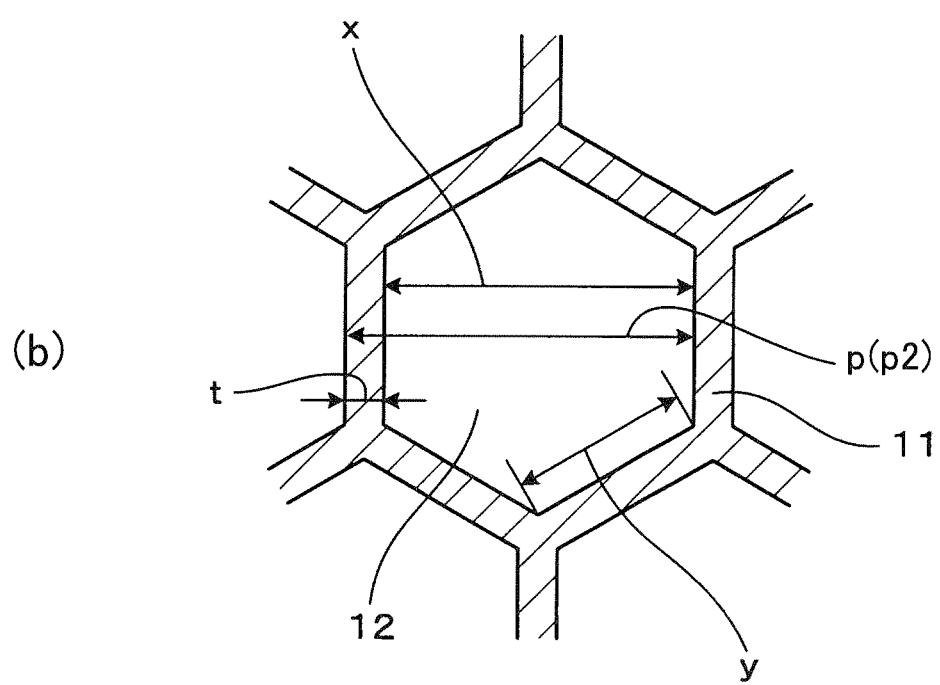

FIG.6
(a) 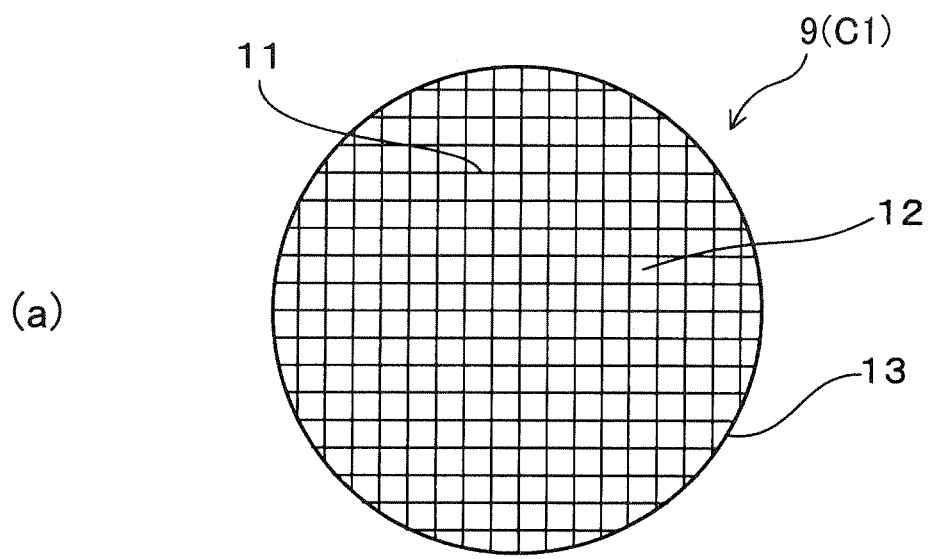
(b) 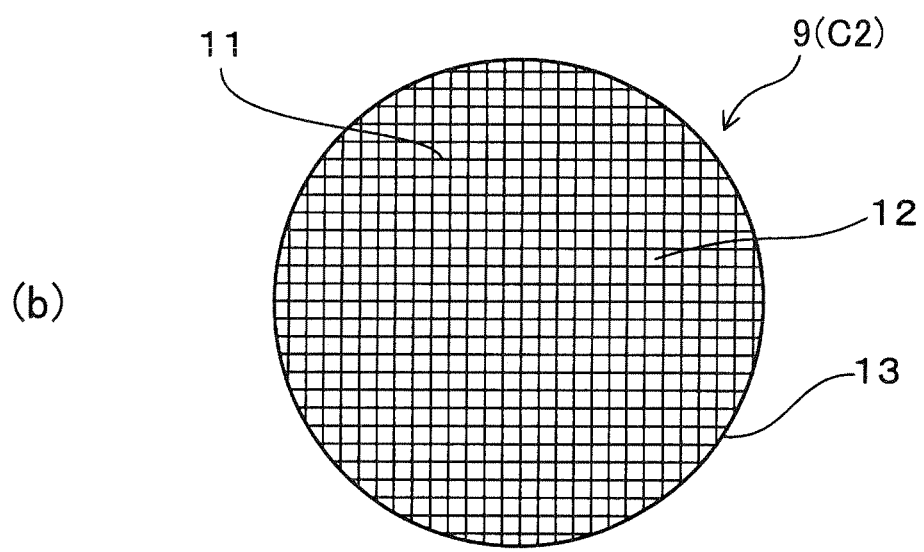

FIG.10
(a) 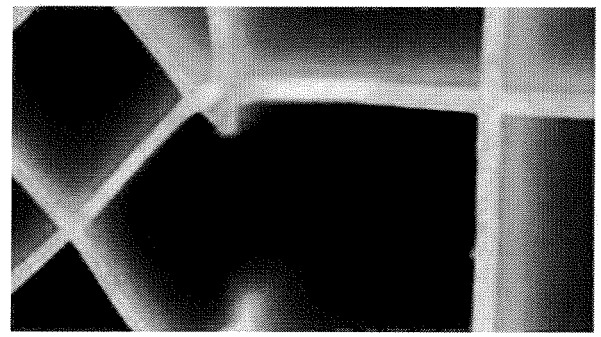
(E1)
(b) 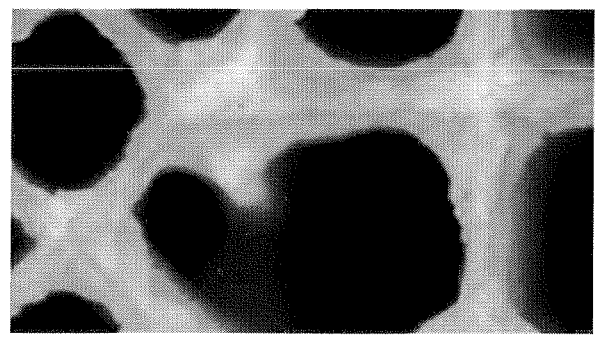
(E1)

FIG.11
(a)
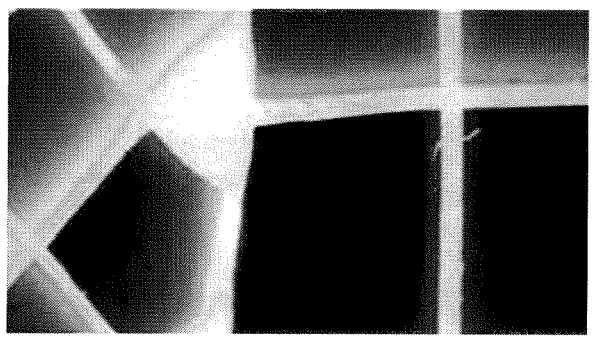
(C3)
(b)
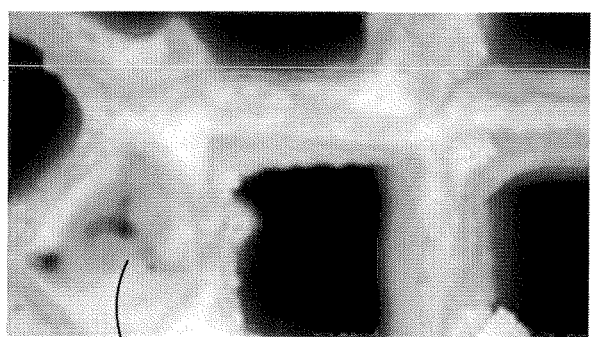
(C3)
P

HONEYCOMB STRUCTURAL BODY

This application is the U.S. national phase of International Application No. PCT/JP2013/051156 filed 22 Jan. 2013 which designated the U.S. and claims priority from Japanese Application No. JP 2012-015738 filed 27 Jan. 2012, and No. 2012-244484 filed 6 Nov. 2012, the entire contents of each of which are hereby incorporated by reference.

TECHNICAL FIELD

The present invention relates to honeycomb structural bodies to be used for a supporting member supporting catalyst capable of purifying exhaust gas emitted from internal combustion engines of motor vehicles, etc.

BACKGROUND ART

There are known honeycomb structural bodies, in which catalyst is supported, capable of purifying exhaust gas emitted from an internal combustion engine of motor vehicles, etc. For example, the honeycomb structural body is comprised of partition walls arranged in a lattice shape and a plurality of cells formed by the partition walls. The honeycomb structural body is mounted to an exhaust gas passage through which exhaust gas is passing. When exhaust gas having a high temperature flows through the honeycomb structural body mounted to the exhaust gas passage, catalyst supported in the honeycomb structural body is activated by the exhaust gas having a high temperature. The activated catalyst purifies the exhaust gas.

Recently, because vehicles emission control for reducing motor vehicle emissions becomes stricter year by year, there is a strong demand for further decreasing harmful materials (cold emissions) generated immediately when an internal combustion engine starts. In order to solve this problem, it is required to use a technique for decreasing a thickness of each of the partition walls to decrease an overall weight of a honeycomb structural body and speedily increase a temperature of the honeycomb structural body to a target temperature in order to activate the catalyst. It is further required to use a technique for providing exhaust gas having a uniform flow speed and distribution to a honeycomb structural body in order to effectively use an overall catalyst supported by the honeycomb structural body. For this reason, it is requested for the honeycomb structural body to have a superior performance of purifying exhaust gas and a low pressure loss (also imply referred to as pressure loss), etc.

For example, a patent document 1 has disclosed a honeycomb structural body having a central section and an outer peripheral section in a cross section which is perpendicular to an axial direction of the honeycomb structural body. The patent document 1 has determined a relationship in a catalyst amount, a surface area, a cell density, etc. between the central section and the outer peripheral section. Further, a patent document 2 has disclosed a structure of a honeycomb structural body comprised of an inside peripheral wall having a cylindrical shape, first cells and second cells. In the structure, the first cells have a hexagonal shape arranged in the inside of the inner circumferential wall. The second cells have a shape (a circle, an ellipse, a square and a triangle) different from a hexagonal shape and arranged in the outside of the inner circumferential wall. In addition, a patent document 3 has disclosed a honeycomb structural body comprised of cells having a square shape, and a relationship in an opening ratio and an absorbing ratio, etc. between a central section and an outer peripheral section in the honeycomb structural body.

A patent document 4 has disclosed a honeycomb structural body having a structure in which an inside skin section is formed between a first cell section (as a central section) and a second cell section (as an outer peripheral section). The patent document 4 has determined a relationship in a cell density, etc. between the first cell section and the second cell section. Further, a patent document 5 has disclosed a honeycomb structural body having a structure in which web frames (i.e. partition walls) are formed from a central section toward an outer peripheral section, and the number of the web frames is changed in a radial direction of the honeycomb structural body. Still further, a patent document 6 has disclosed a structure of a honeycomb structural body in which partition walls have a shape protruded from a central point toward an outside, and a cell density of a central section is smaller than a cell density of the outer peripheral section. Still further, a patent document 7 has disclosed a structure of the honeycomb structural body in which an opening ratio of cells is increased sequentially or stepwise from a central section to an outer peripheral section.

Further, a patent document 8 has disclosed a honeycomb structural body having a structure in which a first honeycomb section (as a central section) and a second honeycomb section (as an outer peripheral section) is directly assembled together to form a monolithic mold, and the first honeycomb section and the second honeycomb section have a different cell density, a different thickness of a partition wall, a different shape of a cross section of cells, etc. Still further, a patent document 9 has disclosed a honeycomb structural body comprised of a plurality of honeycomb segments assembled together to form a monolithic body. The patent document 9 has determined a relationship in a thickness of a partition wall, a cell density, etc. between the outermost honeycomb segment, which forms an outermost peripheral surface, and the other honeycomb segments which do not form the outermost peripheral surface. Furthermore, a patent document 10 has disclosed a honeycomb structural body having a section in which a cell density is gradually decreased from a center toward an outer periphery.

CITATION LIST

Patent Literature

[Patent document 1] Japanese patent laid open publication No. JP 2002-177794;
[Patent document 2] Japanese patent laid open publication No. JP 2008-200605;
[Patent document 3] Japanese patent laid open publication No. JP 2008-18370;
[Patent document 4] Japanese patent No. JP 3219292;
[Patent document 5] Japanese Kohyo (Published Japanese translation of a PCT application) No. JP 2009-532605;
[Patent document 6] Japanese patent No. JP 4511396;
[Patent document 7] Japanese patent laid open publication No. JP 2006-281134;
[Patent document 8] Japanese patent No. JP 4640903;
[Patent document 9] Japanese patent No. JP 4094823; and
[Patent document 10] Japanese patent No. JP 4332847.

SUMMARY OF INVENTION

Technical Problem

However, the honeycomb structural bodies disclosed in the patent documents 1 to 5 have the inside peripheral wall formed between the central section and the outer peripheral section. The presence of the inside peripheral wall generates imperfect cells having an imperfect shape around the inside peripheral wall. (The imperfect cell are not surrounded by partition walls only, but are surrounded by a combination of partition walls and the inside peripheral walls.) Accordingly, when the catalyst is supported by the honeycomb structural body, this structure would cause cell clogging with catalyst, and increase a pressure loss of the honeycomb structural body by the cell clogging. Further, although the patent document 3 has also disclosed another structure of the honeycomb structural body without any inside peripheral wall, this provides a possible decrease in a thermal shock resistance because both the cells formed in the central section and the outer peripheral section have the same shape.

Further, the patent document 6 has disclosed the structure of the honeycomb structural body in which the flow of exhaust gas is concentrated in the central section because the exhaust gas can easily flow in the central section, and this generates a part in which a cell density becomes decreased non-uniformity toward the outside in the outer peripheral section. Accordingly, this structure of the honeycomb structural body does not have a possible contribute for purifying exhaust gas in consideration of the flow of the exhaust gas. Further, the patent document 6 does not disclose any data regarding the purification of exhaust gas. Still further, because each of the cells does not have a perfect circle shape, exhaust gas becomes difficult to flow through the cells formed in the outer peripheral section along a longitudinal direction of the honeycomb structural body, it has a possible difficulty of providing adequate purification performance of the exhaust gas purification. Still further, the patent documents 7 to 10 have the structure of the honeycomb structural body in which a plurality of the plural honeycomb segments is assembled to form a monolithic mold. This structure increases a thickness of the partition walls formed at the joint area of the honeycomb segments, and as a result increases a pressure loss of the honeycomb structural body.

The present invention has been completed with a view to addressing the above issues and has an object to provide a honeycomb structural body showing a decreased pressure loss and providing its improved exhaust gas purification performance.

Solution to Problem

In accordance with an aspect of the present invention, an exemplary embodiment provides a honeycomb structural body as a monolithic mold comprising partition walls arranged in a lattice shape and a plurality of cells surrounded by the partition walls. The honeycomb structural body has a boundary section and a plurality of cell density sections having a different cell density formed in a radial direction from a central side to an outer peripheral side. The boundary section is formed between the cell density sections which are immediately adjacent. The boundary section has boundary partition walls and a plurality of boundary cells having a polygonal shape. The boundary partition walls connect the partition walls in the cell density sections formed adjacent to the boundary section. The boundary cells having a polygonal shape are different in shape from the cells in the cell density sections. At least a part of the boundary cell is surrounded by the boundary partition walls. The honeycomb structural body satisfies a relationship of $\phi 1/\phi 2 \geq 1.25$, where $\phi 1$ indicates an average hydraulic diameter of the boundary cells in the boundary section, and $\phi 2$ indicates an average hydraulic diameter of the cells in the cell density section formed directly inside of the boundary section (Claim 1).

Advantageous Effects of Invention

The honeycomb structural body previously described has the plural cell density sections, a cell density of which is changed stepwise in a radial direction which is perpendicular to an axial direction in a cross section (hereinafter, which will also be referred to as a radial cross section). In addition, the boundary section is formed between the cell density sections and separates the cell density sections in order to partition off the adjacent cell density sections. The boundary section has the boundary partition walls and the plural boundary cells having a polygonal shape. The boundary partition walls connect the partition walls in the cell density sections adjacently formed to the boundary section. The boundary cells having a polygonal shape are different in shape from the cells in the cell density sections formed at both sides of the boundary section, and at least a part of each of the boundary cells is surrounded by the boundary partition walls.

That is, in the structure of the honeycomb structural body previously described, the boundary section is formed in a boundary between the cell density sections having a changed cell density and has the partition walls (i.e. the boundary partition walls) and the cells (i.e. the boundary cells) which is similar in structure to these of the cell density sections. This structure makes it possible to prevent formation of imperfect cells in the boundary area between the cell density sections. In this case, such imperfect cells are formed in the boundary section and have a hydraulic diameter which is smaller than a hydraulic diameter of the cells in the cell density section which is formed immediately inside of the boundary section. This structure makes it possible to suppress generation of cell clogging with catalyst in the boundary section formed between the cell density sections.

Still further, the honeycomb structural body previously described satisfies the relationship of $\phi 1/\phi 2 \geq 1.25$, where $\phi 1$ indicates the average hydraulic diameter of the boundary cells in the boundary section, and $\phi 2$ indicates the average hydraulic diameter of the cells in the cell density section formed directly inside of the boundary section. This makes it possible that catalyst is easily supported in the boundary cells (more concretely, on the surfaces of the boundary partition walls) when compared with the cell density sections. It is thereby possible to suppress generation of cell clogging in the boundary cells in the boundary section. As a result, it is possible to adequately have the effects of decreasing a pressure loss of the honeycomb structural body and increasing exhaust gas purification performance.

Still further, in the honeycomb structural body previously described, because the cell density section having a high cell density is arranged in the area (for example, in the spectral section) through which most amount of exhaust gas flows, it is possible to quickly increase a temperature to an activation temperature at which catalyst in the honeycomb structural body is activated immediately after an internal combustion engine starts. This makes it possible to decrease emissions and further increase the exhaust gas purification performance. Still further, for example, because the cell density section having a low cell density is arranged at the outside area of the honeycomb structural body, it is possible to easily flow exhaust gas through the cell density section formed in the outside area of the honeycomb structural body. This makes it possible to uniformly supply exhaust gas to each of the cell density sections of the honeycomb structural body, and further increase the exhaust gas purification performance. Furthermore, because this structure increases an opening ratio (which is a ratio of an opening area to a sectional area of a cross section in an axial direction) of the overall honeycomb structural body, it is possible to decrease a pressure loss of the honeycomb structural body.

As previously described, it is possible to provide the honeycomb structural body capable of decreasing the pressure loss and increasing the exhaust gas purification performance.

BRIEF DESCRIPTION OF DRAWINGS

FIG. 1 are perspective views explaining a honeycomb structural body according to the present invention, (a) shows an exemplary embodiment having two cell density sections and (b) shows an exemplary embodiment having a plurality of cell density sections.

FIG. 5 are perspective views explaining a cell pitch of cells in the honeycomb structural body according to the embodiments, (a) shows a case in which a cell has a square shape, and (b) shows a case in which a cell has a hexagonal shape.

FIG. 6 are views explaining a cross section in a radial direction of a honeycomb structural body according to comparison examples, (a) shows a comparison example C1, and (b) shows a comparison example C2.

FIG. 10 are views showing microscope photographs which show an end surface in an axial direction of the honeycomb structural body according to the embodiment E, (a) shows the end surface of the honeycomb structural body before catalyst is supported, and (b) shows the end surface of the honeycomb structural body after the catalyst has supported.

FIG. 11 are views showing microscope photographs which show an end surface in an axial direction of the honeycomb structural body according to the comparison example C3, (a) shows the end surface of the honeycomb structural body before catalyst is supported, and (b) shows the end surface of the honeycomb structural body after the catalyst has been supported.

DESCRIPTION OF EMBODIMENTS

Figure 2:
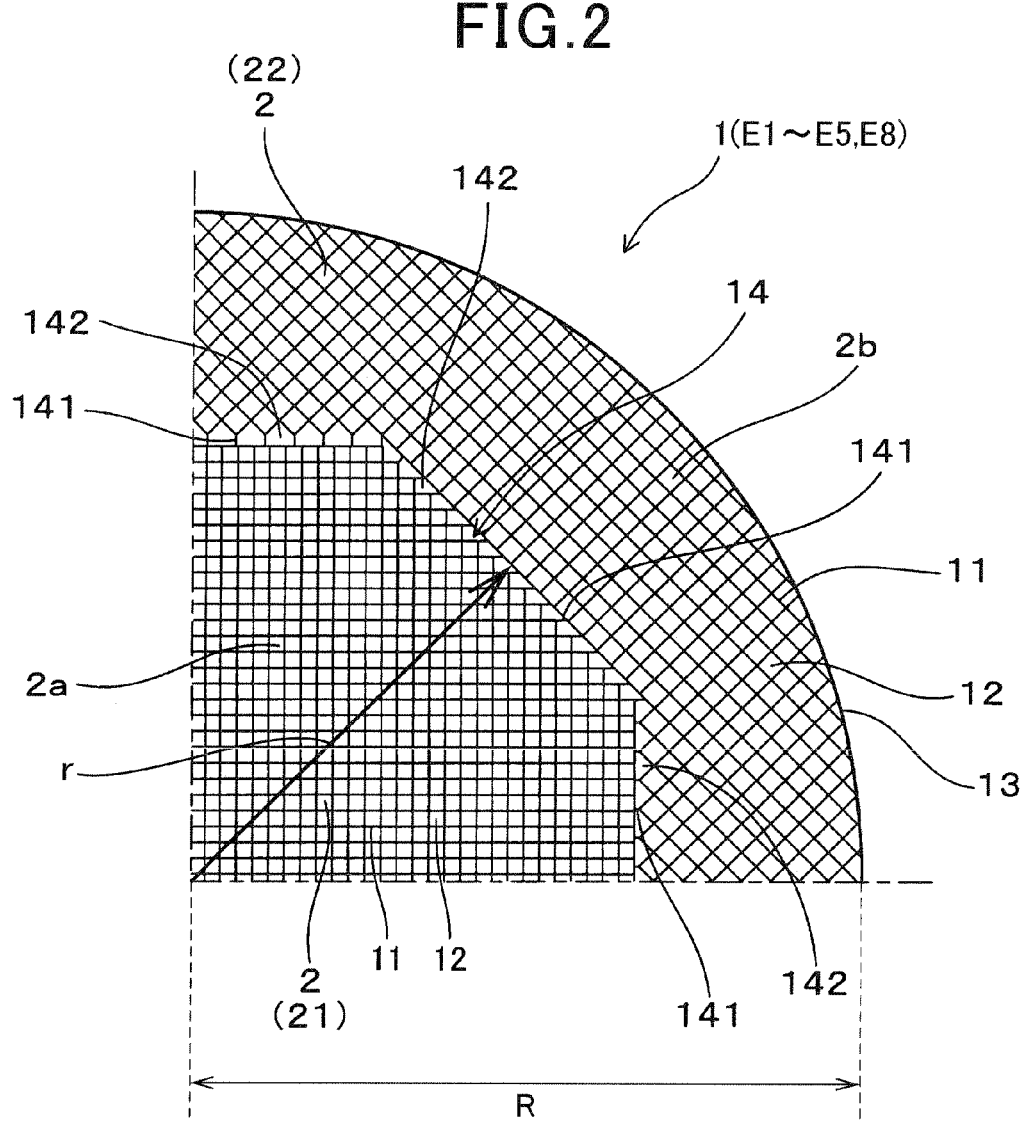
FIG. 2 is a view explaining a cross section in a radial direction of the honeycomb structural body according to embodiments E1 to E5 and E8.

As previously described, the honeycomb structural bodies according to the present invention has a plurality of the cell density sections having a different cell density which is changed stepwise from a central side to the outer peripheral side in a cross section in a radial direction. That is, the honeycomb structural body is divided in a radial direction to a plurality of sections (i.e. the cell density sections) from the central side to the outer peripheral side. Each of the cell density sections has a constant cell density. The cell density sections adjacent to each other have a different cell density so that the cell density of the cell density sections is changed stepwise in a radial direction.

Further, the boundary cells in the boundary section have a polygonal shape which is different from a shape of the cells in the cell density sections formed at both sides of the boundary section. For example, it is possible for the boundary section to have flexibility when the boundary cells formed in the boundary section has a shape (for example, a pentagon shape) having a low rigidity which is different in shape from the cells formed in the cell density sections. That is, this makes it possible to give flexibility to a part of the honeycomb structural body, and to increase thermal shock resistance.

Still further, when the relationship of the average hydraulic diameters $\phi1$ and $\phi2$ is $\phi1/\phi2<1$, there is a possibility that catalyst cannot be easily supported in the boundary cells (specifically, on the surfaces of the boundary partition walls) formed in the boundary section. This causes difficulty in adequately obtaining the effects of suppressing generation of cell clogging in the boundary cells of the boundary section. Accordingly, the present invention satisfies the relationship of $\phi1/\phi2 \geq 1.25$ regarding the average hydraulic diameters $\phi1$ and $\phi2$.

Still further, it is possible for the average hydraulic diameters $\phi1$ and $\phi2$ to satisfy the relationship of $1.25 \leq \phi1/\phi2 \leq 2.02$ (Claim 2). This relationship makes it possible for the boundary cells in the boundary section to easily support catalyst when compared with the cells in the cell density sections, and to obtain the effect of adequately suppressing cell clogging with catalyst in the boundary cells of the boundary section.

When the relationship of the average hydraulic diameters $\phi1$ and $\phi2$ is $\phi1/\phi2>2.02$, because a difference in a flow passage resistance between the boundary section and the cell density section becomes large, it would cause for these sections to have a different tendency to easily support catalyst. This introduces a difficulty of uniformly supporting catalyst in the honeycomb structural body. Further, when slurry containing noble metal as catalyst is applied in the honeycomb structural body, an unnecessary amount of catalyst is consumed. This is not preferable in terms of manufacturing cost.

The average hydraulic diameter $\phi1$ previously described is an average value of equivalent hydraulic diameter of the boundary cells in the boundary section. Further, the average hydraulic diameter $\phi2$ previously described is an average value of equivalent hydraulic diameter of the cells in the cell density section formed directly inside of the boundary section. The equivalent hydraulic diameter $\phi$ is expressed by an equation of $\phi=4a/b$, where reference character a indicates an inside area of the cells (boundary cells) in a cross section in a radial direction of the honeycomb structural body, and reference character b indicates a length of a circumference of the honeycomb structural body.

Further, it is possible for the honeycomb structural body to have a structure which satisfies a relationship of 1<Ma/Mb≤2.2, where reference character Ma indicates a maximum cell density of the cell density section (hereinafter, will also be referred to as the high cell density section), excepting the cell density section formed at an outermost side in the plural cell density sections, and reference character Mb indicates a minimum cell density of the cell density section (hereinafter, will also be referred to as the low cell density section) in the plural cell density sections (Claim 3). This structure makes it possible to adequately provide the effect of decreasing emissions and improving the exhaust gas purification performance. In addition, it is preferable for the value of Ma/Mb to be within a range of 1.25 to 1.87 in order to have higher exhaust gas purification performance.

When the relationship between the cell densities Ma and Mb is Ma/Mb≤1, most exhaust gas is concentrated to and flows in the central part of the honeycomb structural body. This causes a difficulty in effectively using the overall honeycomb structural body and providing the effects of decreasing emissions and improving the exhaust gas purification performance. On the other hand, when the relationship of the cell densities Ma and Mb is Ma/Mb>2.2, exhaust gas easily flows through the outside area of the honeycomb structural body because the outside area has an extremely low cell density when a high cell density section is arranged at an area, through which most of exhaust gas flows (for example, at a central section) and a low cell density section is arranged at the outside of the high cell density section. This structure causes exhaust gas to not be adequately purified by passing through the honeycomb structural body, and as a result decreases the exhaust gas purification performance.

It is possible for the high cell density section to have the cell density within a range of 62 to 186 cells/cm$^2$, and it is further possible for the low cell density section to have the cell density within a range of 46.5 to 139.5 cells/cm$^2$, for example. Further, it is possible for the partition wall in the high cell density section to have the thickness within a range of 30 to 120 μm, and it is possible for the partition wall in the low cell density section to have a thickness within a range of 50 to 200 μm, for example.

Still further, it is possible for the honeycomb structural body to have a structure which satisfies a relationship of 0.16<r/R<1, where reference character R indicates a radius of the honeycomb structural body, and reference character r indicates a radius of the boundary section which partitions off the cell density section having the maximum cell density, excepting the outermost cell density section in the plural cell density sections, and the cell density section formed outwardly adjacent to the cell density section having the maximum cell density (Claim 4). This structure makes it possible to provide the effect of adequately decreasing emissions and increasing the exhaust gas purification performance. It is further preferable to have the value r/R to be within a range of 0.5 to 0.8 in order to have higher exhaust gas purification performance. When the honeycomb structural body or the boundary section has a circular shape, the radius R, r is a radius thereof. On the other hand, when the honeycomb structural body or the boundary section has a polygonal shape, the radius R, r is a radius of an inscribed circle thereof.

In addition, it is possible for the honeycomb structural body to have a structure in which the cell density section having a maximum cell density, excepting the cell density section arranged at the outermost side in the plural cell density sections, is arranged at an innermost side. Because this structure allows the high cell density section having a large surface area to be arranged at a part (for example, at the central side) through which most of exhaust gas is passing, it is possible to have the effects of adequately decreasing emissions and improve the exhaust gas purification performance. In this structure, it is not necessary for a central axis of the high cell density section to be equal to the central axis of the honeycomb structural body. For example, it is possible to locate the high cell density section at an optimum side on the basis of a shape of the exhaust gas pipe, to which the honeycomb structural body is mounted, and a flow of the exhaust gas, etc.

In addition, it is possible for the honeycomb structural body to have a structure in which the plural sections are composed of two cell density sections, i.e. an inside cell density section and an outside cell density section. Each of the inside cell density section and the outside cell density section is comprised of the partition walls arranged in a square lattice shape and square shaped cells surrounded by the partition walls. A ratio of a cell density of the inside cell density section formed at the inner side to a cell density of the outside cell density section formed at the outer side is 2:1. The cells in the outside cell density section formed at the outside area have a tilt to the cells in the inside cell density section formed at the inside area by 45 degrees (see FIG. 3 and FIG. 4 described later). This structure makes it possible to improve the strength (such as an isostatic strength, etc.) of the honeycomb structural body. In addition, when the boundary partition walls in the boundary section connect lattice points (joints) of the partition walls in the cell density sections formed at both sides of the boundary section, it is possible to further improve the strength (i.e the isostatic strength, etc.) of the honeycomb structural body (see FIG. 3 and FIG. 4 described later).

It is possible for the honeycomb structural body to have a structure comprised of two cell density sections, i.e. a high cell density section and a low cell density section, in which the high cell density section is arranged at an inner side (i.e. at the central side) and the low cell density section is arranged at an outer side (i.e. at the outer peripheral side). This structure makes it possible to adequately have both the effect of decreasing emissions and increasing the exhaust gas purification performance, and the effect of making a more uniform flow of the exhaust gas and improving the exhaust gas purification performance.

It is possible for the honeycomb structural body to have a structure comprised of not less than three cell density sections in which the cell density sections are arranged to decrease the cell density stepwise in a radial direction from the central side to the outer side (i.e. to the outer peripheral side). This structure makes it possible to more improve the effects of uniformly supplying exhaust gas and improving the exhaust gas purification performance. However, this structure has a possible decrease of a cell density of the outermost cell density section too low, and as a result, and as a result there is a possible decrease of the strength (i.e. isostatic strength) of the honeycomb structural body. In order to avoid this, it is preferable to increase the cell density of the outermost cell density section in order to keep the overall strength of the honeycomb structural body.

The honeycomb structural body previously described is used for catalytic converters, etc. capable of purifying exhaust gas by using catalyst. In this case, catalyst is supported on the surfaces of the partition walls in the honeycomb structural body. It is possible for the honeycomb structural body to have the porosity within a range of 10% to 70%, for example. It is preferable for each of the cell density sections to have the same porosity.

It is possible for the cells to have a circle and a polygonal shape, etc. (for example, a square shape and a hexagonal shape) in a cross section in a radius direction. In addition, it is possible for the cell density sections to have an exterior shape of a circle, a polygonal shape, etc. in a cross section in a radius direction.

It is possible for the boundary section to have an exterior shape of a circle and a polygonal shape (for example, a square, a hexagonal, etc.) in a cross section in a radius direction. In addition, it is possible for the boundary cells to have a polygonal shape such as a square, a pentagon, etc. in a cross section in a radius direction.

It is possible for the boundary partition walls to have a thickness within a range of 30 to 160 μm. Further, it is possible to improve the strength (i.e. isostatic strength, etc.) of the honeycomb structural body when lattice points (joints) of the partition walls, arranged in a lattice shape in the cell density sections formed at both sides of the boundary section, are connected together.

Examples

In the exemplary embodiment, a plurality of honeycomb structural bodies (embodiments E1 to E8) and a plurality of honeycomb structural bodies (comparison examples C1 to C4) were produced, and a pressure loss, exhaust gas purification performance, thermal shock resistance, etc. thereof were evaluated.

Figure 3:
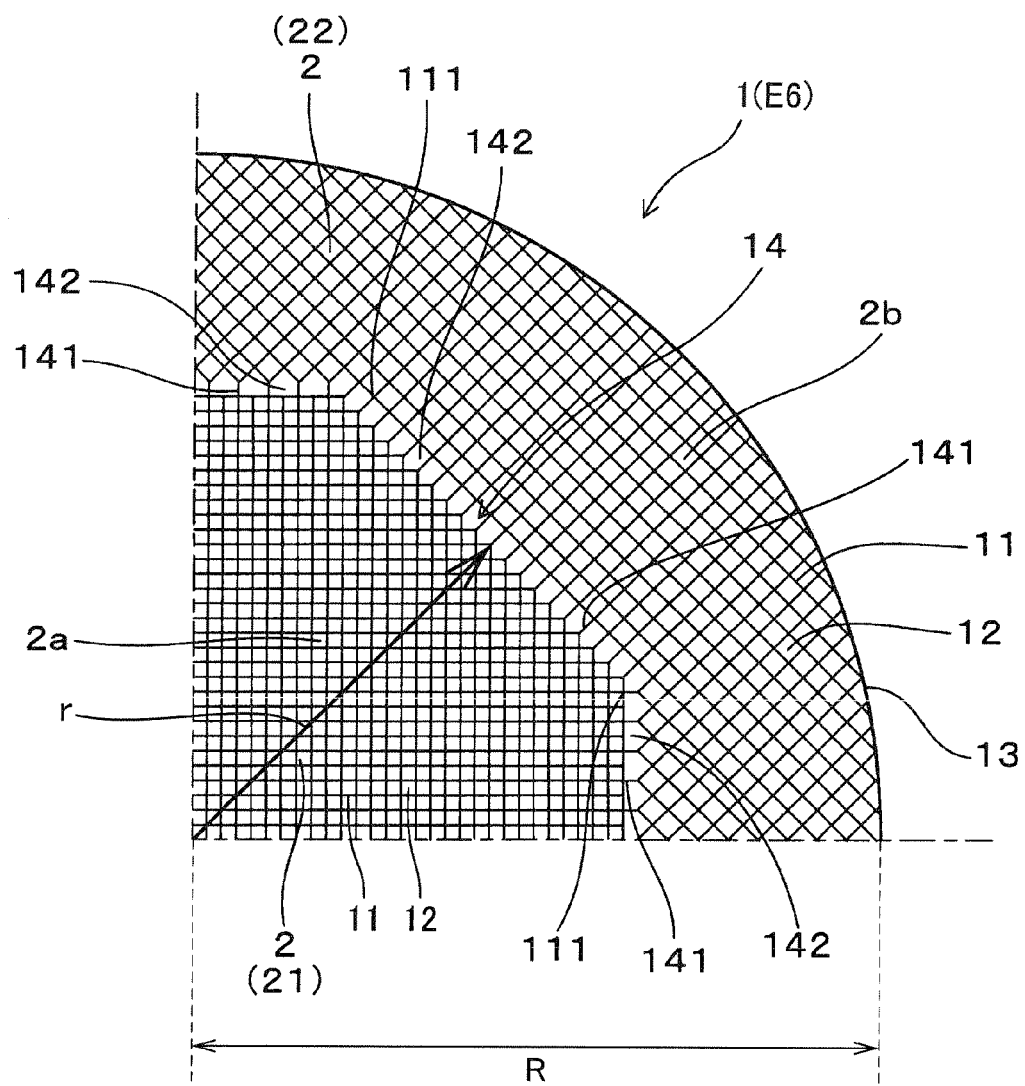
FIG. 3 is a view explaining a cross section in a radial direction of the honeycomb structural body according to an embodiment E6.
Figure 4:
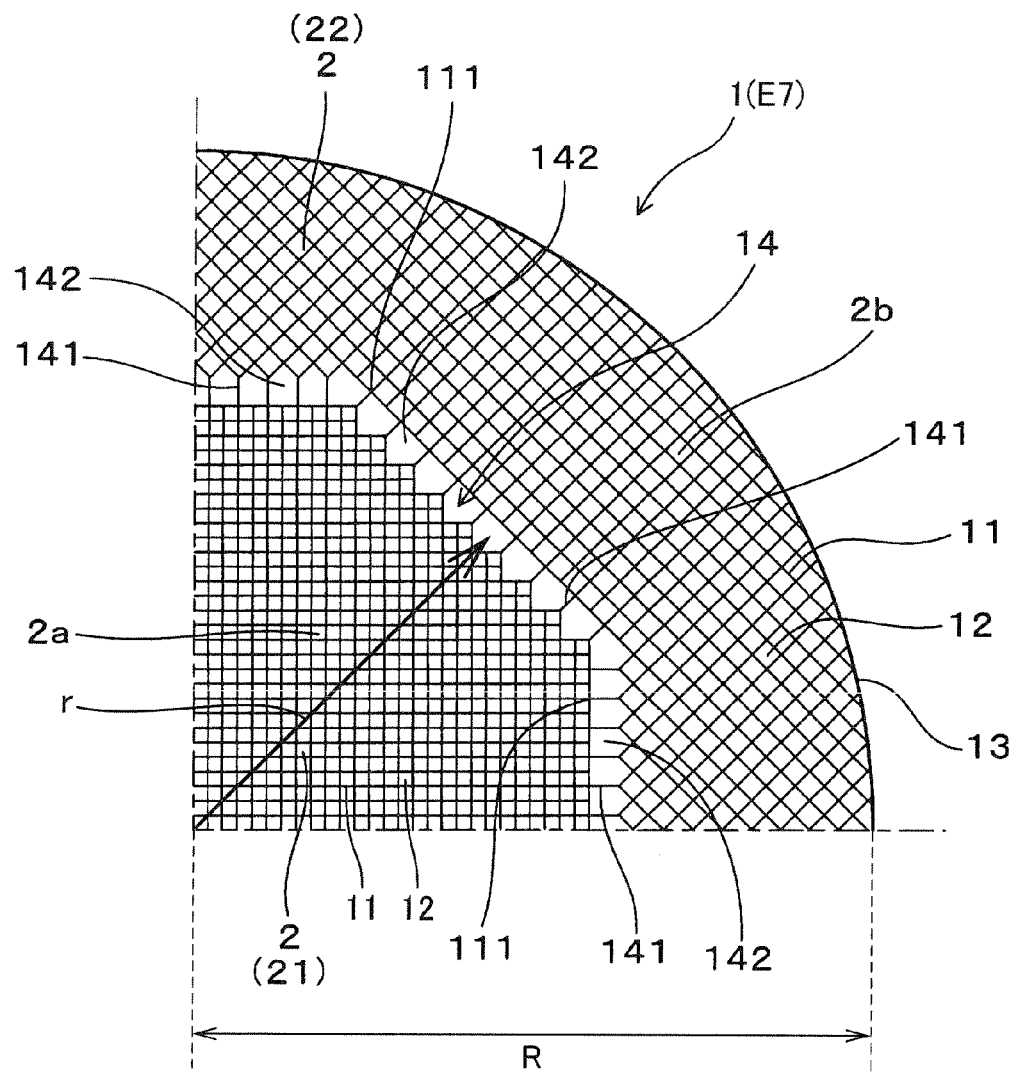
FIG. 4 is a view explaining a cross section in a radial direction of the honeycomb structural body according to an embodiment E7.

A description will be given of the honeycomb structural bodies (embodiments E1 to E8) according to the exemplary embodiment with reference to figures. As shown in FIG. 1 to FIG. 4, the honeycomb structural body 1 is comprised of partition walls 11 arranged in a lattice shape and a plurality of cells 12 formed surrounded by the partition walls 11 to form a monolithic mold. In addition, the honeycomb structural body 1 is comprised of a plurality of cell density sections 2 (21, 22) having a different cell density in a cross section perpendicular to an axial direction X from a central side to the outer peripheral side. A boundary section 14 is formed between the cell density sections 2 which are adjacent to each other. FIG. 1 (a) and FIG. 2 to FIG. 4 show the honeycomb structural body 1 having the two cell density sections 2 (21, 22) having a different cell density. However, it is acceptable for the honeycomb structural body to have a plurality of cell density sections 2 (not less than three, 21, 22, . . . , and 2n) as shown in FIG. 1 (b).

As shown in these figures, the boundary section 14 is comprised of boundary partition walls 141 and a plurality of boundary cells 142. The partition walls 11 in the cell density sections 2 (21, 22) arranged at both sides of the boundary section 14 are connected to each other by the boundary partition walls 141. The boundary cells 142 have a polygonal shape which is different in shape from the cells 12 formed in the cell density sections 2 arranged at both sides of the boundary section 14. A part of the boundary cell 142 is surrounded by the boundary partition wall 141. Further, the honeycomb structural body 1 satisfies a relationship of $\phi1/\phi2 \geq 1.25$, where $\phi1$ indicates an average hydraulic diameter of the boundary cell 142 formed in the boundary section 14, and $\phi2$ indicates an average hydraulic diameter of the cell 12 formed in the cell density section 2 which is arranged immediately inside of the boundary section 14. The following description will explain the relationship in detail.

As shown in FIG. 1, the honeycomb structural body 1 (which corresponds to the embodiments E1 to E8) is used as a catalyst supporting member capable of purifying exhaust gas. The honeycomb structural body 1 is comprised of the partition walls 11, the plural cells 12 and an outer peripheral wall 13. The partition walls 11 are arranged in a square lattice shape. The cells 12 are surrounded by the partition walls 11. An outer peripheral surface of the honeycomb structural body 1 is covered with the outer peripheral wall 13. The honeycomb structural body 1 is made of cordierite and formed to a monolithic mold. The honeycomb structural body 1 has a diameter of 103 mm and a length of 105 mm.

As shown in FIG. 2 (which shows the embodiments E1 to E5, and embodiment E8), FIG. 3 (which shows the embodiment E6), and FIG. 4 (which shows the embodiment E7), in the structure of the honeycomb structural body 1, a cross section (i.e. a radial cross section) perpendicular to an axial direction X (see FIG. 1) of the honeycomb structural body 1 is divided to two cell density sections 2 (i.e. a first cell density section 21 and a second cell density section 22) from a central side to an outer peripheral side. Each of the cell density sections 2 has a constant cell density, respectively. The cell density sections 2 which are adjacent to each other have a different cell density which is changed stepwise toward the radial direction. FIG. 2, FIG. 3 and FIG. 4 show a quarter of a cross section in a radial direction of the honeycomb structural body 1.

As shown in these figures, the first cell density section 21 is arranged at the innermost side, i.e. at the central side of the honeycomb structural body 1. The first cell density section 21 is a cell density section 2 (i.e. a high cell density section 2a) having a maximum cell density, excepting the cell density section 2 formed at the outermost side. In addition, the partition wall 11 in the first cell density section 21 has a thickness of 0.09 mm (90 μm). The second cell density section 22 is arranged at the outermost side at the outer periphery of the honeycomb structural body 1. The second cell density section 22 is a cell density section 2 (i.e. a low cell density section 2b) having a minimum cell density. The partition wall 11 in second cell density section 22 has a thickness of 0.09 mm (90 μm).

The honeycomb structural body 1 shown in FIG. 2 to FIG. 4 has the structure in which the first cell density section 21 and the second cell density section 22 tilt in a different direction (the cells 22 in the second cell density section 22 tilt to the cells 12 in the first cell density section 21 by 45 degrees). For example, it is possible to have a structure in which the cells 22 in the second cell density section 22 and the cells 12 in the first cell density section 21 tilt in the same direction.

Still further, as shown in FIG. 2 to FIG. 4, the honeycomb structural body 1 satisfies a relationship of $1 < Ma/Mb \leq 2.2$, where reference character Ma indicates a cell density of the high cell density section 2a (i.e. the first cell density section 21), and reference character Mb indicates the minimum cell density of the low cell density section 2b (i.e. the second cell density section 22). Table 1 shows cell density (cells/cm$^2$) and a cell density ratio Ma/Mb of the cell density section 2 (i.e. the first cell density section 21, the second cell density section 22) of each of the honeycomb structural bodies 1 (as the embodiments E1 to E8)

A description will now be given of the method of obtaining a cell density of each of the cell density sections 2. A cell pitch P shown in FIG. 5(a) and FIG. 5(b) is measured by using a tool maker's microscope, another microscope, etc. in order to obtain a cell density in a radial cross section of the honeycomb structural body 1. The cell density (cpsi) can be calculated by using the following equation and the measured cell pitch P. The exemplary embodiment used a microscope (VHX-900 manufactured by KEYENCE CORPORATION) and measured five points of each of the cell density sections 2 and calculated an average value of the measured cell pitches P. The reference character "cpsi" of the cell density expresses the number of cells per square inch. Table 1 uses the unit (cells/cm$^2$) which is converted from the unit "cpsi".

For example, as shown in FIG. 5(a), when the cell 12 has a square shape, like the structure of the embodiments E1 to E8, and an average cell pitch is p1, the cell density (cpsi) is calculated by using the following equation: Cell density (cpsi)=(25.4/p1)$^2$. In addition, as shown in FIG. 5 (b), when the cell 12 has a hexagonal shape and an average cell pitch is p2, the cell density (cpsi) is calculated by the relational equation of Cell density (cpsi)=(2/√3)×(25.4/p2)$^2$.

In addition, as shown in FIG. 2 to FIG. 4, the boundary section 14 is formed between the cell density sections 2 (21, 22), which are adjacent to each other, in order to partition off both the cell density sections 2. The boundary section 14 has an octagonal shape (see FIG. 1). The boundary section 14 is comprised of the boundary partition walls 141 and the boundary cells 142. The boundary partition walls 141 connect the partition walls 11 in the cell density sections 2 (i.e. the first cell density section 21 and the second cell density section 22) arranged at both the sides of the boundary section 14. The boundary cell 142 is surrounded by the boundary partition walls 141 and the partition walls 11 in the cell density sections 2 (i.e. the first cell density section 21 and the second cell density section 22) arranged at both the sides of the boundary section 14. In addition, the boundary cell 142 has a different shape of the cells 12 in the cell density sections 2 (i.e. the first cell density section 21 and the second cell density section 22) formed at both the sides of the boundary section 14.

As shown in FIG. 2, the honeycomb structural body 1 according to the embodiments E1 to E5 and E8 has the boundary cells 142 having a square shape and a pentagonal shape (which is different in shape from the square shape of the cell 12 in the cell density section 2). As shown in FIG. 3 and FIG. 4, the honeycomb structural body 1 according to the embodiments E6 and E7 has the boundary cells 142 having a pentagonal shape. Further, in the honeycomb structural body 1 according to the embodiments E6 and E7, a cell density ratio between the cell density section 2 (i.e. the first cell density section 21) arranged in the inner side and the cell density section 2 (i.e. the second cell density section 22) arranged in the outer side is 2:1. Still further, the boundary partition walls 141 are formed so that the boundary partition walls 141 connect the lattice points (joints) of the partition walls 11 arranged in a lattice shape in the cell density sections 2 (i.e. the first cell density section 21 and the second cell density section 22) arranged at both the sides of the boundary section 14. This structure improves the strength (i.e. the isostatic strength, etc.) of the honeycomb structural body 1.

As shown in FIG. 2 to FIG. 4, the honeycomb structural body 1 according to the embodiments E1 to E8 satisfies the relationship of φ1/φ2≥1.25, where φ1 indicates an average hydraulic diameter of the boundary cells 142 in the boundary section 14, and φ2 indicates an average hydraulic diameter of the cells 12 in the cell density section 2 formed directly inside of the boundary section 14. Table 1 shows an average hydraulic diameter (mm) and a ratio φ1/φ2 of the average hydraulic diameters of the cells in each of the cell density sections 2 (as the first cell density section 21 and the second cell density section 22) formed in the honeycomb structural bodies 1 (corresponding to the embodiments E1 to E8).

Still further, as shown in figures, the honeycomb structural body 1 satisfies a relationship of 0.16<r/R<1, where reference character R indicates a radius of the honeycomb structural body 1, and reference character r indicates a radius of the boundary section 14 which partitions the high cell density section 2a (i.e. the first cell density section 21) from the cell density section 2 (i.e. the second cell density section 22) formed outwardly adjacent to the cell density section 2a. Because the boundary section 14 has an octagonal shape (see FIG. 1) in the honeycomb structural body 1 according to the embodiments E1 to E7, its inscribed circle has a radius r. In the embodiments, it is formed so that the inscribed circle is in contact with the inside of the partition walls 11 which form the boundary cells 142 located at 0°, 90°, 180° and 270° of the honeycomb structural body 1. Table 1 shows the location r/R of the boundary section of each of the honeycomb structural body 1 according to the embodiments E1 to E8.

Next, a description will now be given of the honeycomb structural body 9 (according to comparison examples C1 to C4) with reference to figures.

As shown in FIG. 6(a) and FIG. 6(b), the honeycomb structural body 9 according to the comparison examples C1 and C2 is comprised of a cell density section only (i.e. the first cell density section shown in Table 1), which is different in structure from the honeycomb structural body 1 according to the embodiments E1 to E8 as previously described. That is, the overall honeycomb structural body 9 has a constant cell density. The honeycomb structural body 9 according to the comparison example C1 (see FIG. 6(a)) has a cell density which is lower than the cell density of the honeycomb structural body 9 according to the comparison example C2 (see FIG. 6(b)). Other components of the honeycomb structural body 9 have the same structure as those of the honeycomb structural body 1 according to the embodiments E1 to E8 previously described. Table 1 shows an average hydraulic diameter (mm), a cell density (cells/cm$^2$), etc. of the cell density section 2 in the honeycomb structural body 9 (as the comparison examples C1 and C2).

Figure 7:
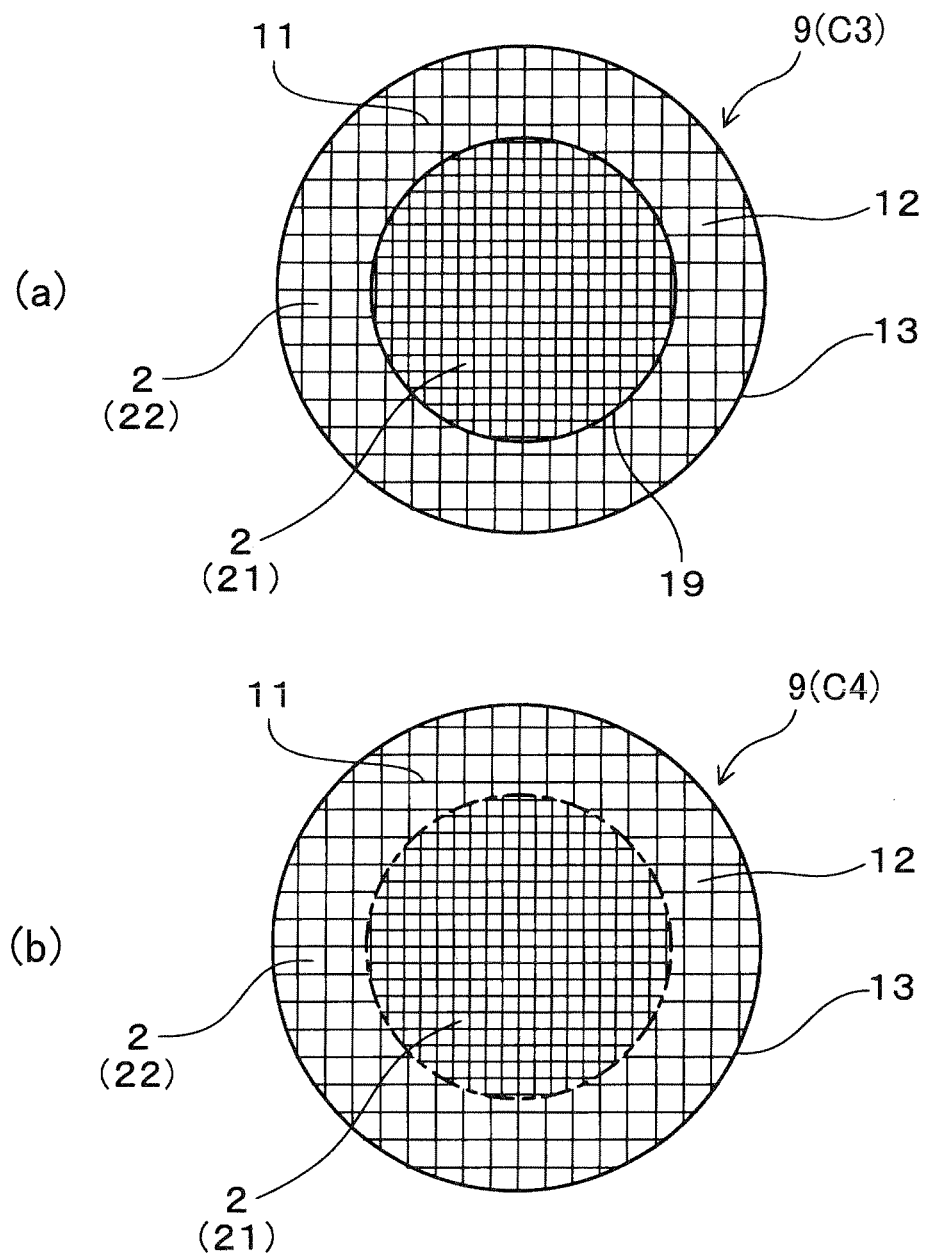
FIG. 7 are views explaining a cross section in a radial direction of a honeycomb structural body according to comparison examples, (a) shows a comparison example C3 and (b) shows a comparison example C4.

As shown in FIG. 7(a), the honeycomb structural body 9 as the comparison example C3 is comprised of two cell density sections 2 (i.e. the first cell density section 21 and the second cell density section 22), like the structure of the honeycomb structural body 1 according to the embodiments E1 to E8 as previously described. A partition wall (or an inner peripheral wall) 19 having a cylindrical shape is formed between the cell density sections 2 in the honeycomb structural body 9. Other components of the honeycomb structural body 9 have the same structure of those of the honeycomb structural body 1 as the embodiments E1 to E8 previously described.

Table 1 shows an average hydraulic diameter (mm), a cell density (cells/cm$^2$), etc. of each cell density section 2 (as the first cell density section 21 and the second cell density section 22) in the honeycomb structural body 9 (as the comparison example C3). As shown in Table 1, the average hydraulic diameter of the boundary section in the honeycomb structural body 9 as the comparison example C3 indicates an average hydraulic diameter an imperfect cell 12 formed surrounded by the boundary partition walls 19 and the partition walls 11 in the cell density section 2 (as the first cell density section 21) arranged inside to the boundary partition walls 19. A location r/R of the boundary section indicates a position of the boundary partition walls 19.

As shown in FIG. 7(c), the honeycomb structural body 9 as the comparison example C4 is comprised of two cell density sections 2 (i.e. the first cell density section 21 and the second cell density section 22), like the structure of the honeycomb structural body 1 according to the embodiments E1 to E8 as previously described. However, the honeycomb structural body 9 as the comparison example C4 has no partition wall (i.e. without any inner peripheral wall) between the two cell density sections. Other components of the honeycomb structural body 9 have the same structure of those of the honeycomb structural body 1 as the embodiments E1 to E8 previously described.

Table 1 shows an average hydraulic diameter (mm), a cell density (cells/cm$^2$), etc. of each cell density section 2 (i.e. the first cell density section 21 and the second cell density section 22) in the honeycomb structural body 9 (as the comparison example C4). As shown in FIG. 1, the boundary section in the honeycomb structural body 9 as the comparison example C4 is designated by the dotted line which indicates the boundary section between the first cell density section 21 and the second cell density section 22.

Next, a description will now be given of the method of producing the honeycomb structural body 9 as the embodiments E1 to E8 and the comparison examples C1 to C4. First, ceramic raw material was prepared. The ceramic raw material is substantially composed of kaolin, fused silica, aluminum hydroxide, alumina, talc, carbon particles, etc. to satisfy the chemical composition of cordierite is $SiO_2$:45 to 55%, $Al_2O_3$: 33 to 42% and MgO:12 to 18%. Water, binder, and others of a predetermined amount were added into the ceramic raw material, and then mixed together in order to make the ceramic raw material.

Next, the obtained ceramic raw material was extruded using the extrusion molding die to produce a honeycomb structural mold by using an extrusion die having a plurality of slit grooves. The pattern of the slit grooves corresponded to the arrangement or a shape of the partition walls. The honeycomb structural mold was dried by using microwaves. The dried honeycomb structural mold was cut to have a predetermined length, and then fired at a predetermined maximum temperature (for example, 1390° C. to 1430° C.) to produce the honeycomb structural bodies.

Next, a description will now be given of the evaluation of a pressure loss, exhaust gas purification performance, thermal shock resistance, etc. of the honeycomb structural body (i.e. each of the embodiments E1 to E8 and the comparison examples C1 to C4). Hereinafter, the evaluation method of the pressure loss, exhaust gas purification performance, thermal shock resistance, etc. will be explained.

Figure 8:
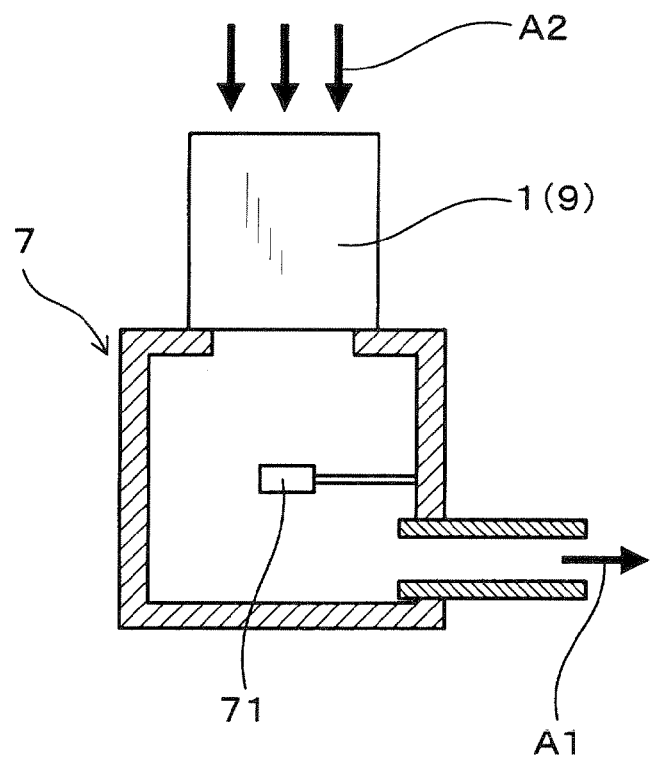
FIG. 8 is a view showing a method of evaluating a pressure loss of the honeycomb structural body according to the embodiments.

In the evaluation of the pressure loss, the honeycomb structural body 1 (9) which has supported catalyst is mounted to a pressure loss evaluation device 7, as shown in FIG. 8. Next, an air blower sucks air A1 in the pressure loss evaluation device 7 out to the outside. After the pressure loss evaluation device 7 has a low pressure, a predetermined amount of air A2 is supplied to the honeycomb structural body 9 so that the amount of the supplied air A2 becomes 6 m$^3$/minute. A pressure sensor 71 in the pressure loss evaluation device 7 detects an inside pressure of the pressure loss evaluation device 7. A difference between the detected pressure and the pressure of the atmosphere is calculated to obtain a pressure loss of the honeycomb structural body. In the exemplary embodiment, a pressure loss ratio is calculated relative to a pressure loss of the comparison example C2.

Figure 9:
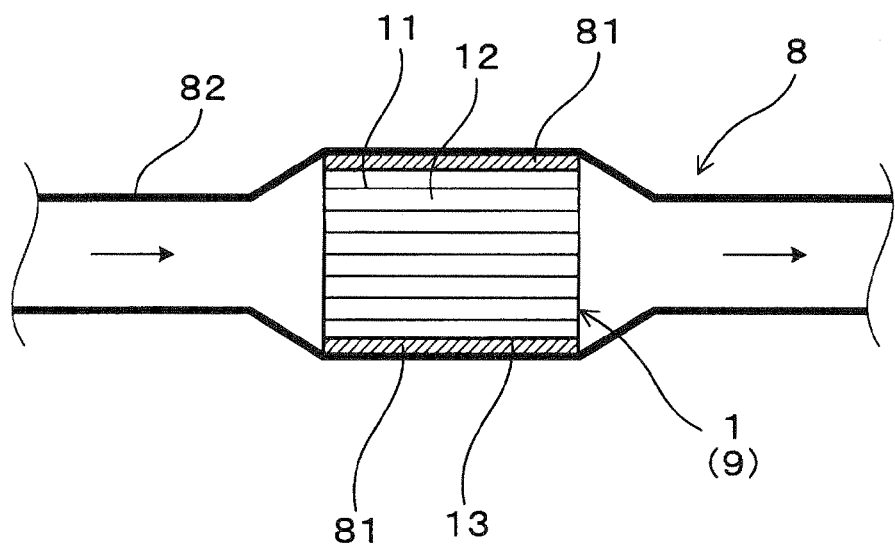
FIG. 9 is a view showing a catalytic converter equipped with the honeycomb structural body according to the embodiments.

In the evaluation of the exhaust gas purification performance, a honeycomb structural body was prepared, which is equivalent in deterioration to a case after a vehicle with the honeycomb structural body has run for one hundred thousand kilometers. Next, as shown in FIG. 9, the honeycomb structural body 1 (9) was mounted to another internal combustion engine. At this time, the honeycomb structural body 1 (9) rolled with an alumina mat 81 was mounted to the inside of an exhaust gas pipe 82 to make a catalytic converter 8. As omitted from the drawings, the honeycomb structural body with catalyst which has been adequately deteriorated by heating by using an electric furnace is mounted to a UF/C position (underfloor catalyst) of the internal combustion engine of a vehicle. After the vehicle has run with a predetermined mode (LA#4 evaluation mode), an amount of each of emissions (HC, CO and NOx) emitted from the internal combustion engine was detected. In the exemplary embodiment, an emission ratio of each of the embodiments and the comparison examples was obtained on the basis of the emission amount of the comparison example C2 as a reference value.

In the exemplary embodiment, the S/C position indicates a position immediately after an exhaust port of the internal combustion engine mounted to the exhaust gas passage through which exhaust gas emitted from the internal combustion engine flows. Further, the UF/C position indicates a position directly under the floor of the vehicle at a downstream side of the S/C position. It is possible to use catalyst, to be supported in the honeycomb structural body, comprised of γ alumina, and/or cerium, and at least one of platinum (Pt), rhodium (Rh) and palladium (Pd) as noble metal, i.e. a three-way catalyst.

Further, the evaluation of generation of cell clogging with catalyst is performed by detecting whether or not cell clogging is generated in the boundary cells in the boundary section when catalyst is supported in the honeycomb structural body as the embodiments E1 to E5. Further, the evaluation of generation of cell clogging with catalyst is performed by detecting whether or not cell clogging is generated in the end surface of an opening section of an imperfect cell formed by the boundary partition walls and the partition walls of the cell density section (as the first cell density section) formed inside of the boundary section when catalyst is supported in the honeycomb structural body as the comparison example C3. The evaluation result indicates reference character "A" when no cell clogging is detected and "B" when the cell clogging is detected.

The evaluation of isostatic strength is performed on the basis of the "isostatic breaking strength test" defined by Japan Automobile Standard JASO standard 505-87 issued by Society of Automotive Engineers of Japan. In a concrete example, the honeycomb structural body is arranged in a cylindrical vessel made of rubber. The cylindrical vessel is sealed with a plate made of aluminum. An isostatic pressing is performed in water for the cylindrical vessel in which the honeycomb structural body is stored. A load when the honeycomb structural body is broken is detected, and the isostatic strength of the honeycomb structural body is calculated on the basis of the detected load. The exemplary embodiment calculates the isostatic breaking strength ratio of the embodiments E1 and E6 on the basis of the isostatic breaking strength of the comparison example C3.

Further, the evaluation of catalyst coating is performed when the honeycomb structural body is arranged so that its axial direction becomes equal to a vertical direction and one opening end surface of the honeycomb structural body is coated with catalyst. At this time, a half of the length, along the axial direction, of the cells formed in the cell density section (i.e. the first cell density section) is coated with catalyst, which is formed directly inside of the boundary section in the honeycomb structural body. A ratio of a catalyst coated length of the boundary cell formed in the boundary section to a half of the length of the honeycomb structural body in each of the embodiments is calculated on the basis of the half of the length of the cells previously defined. On the basis of the evaluation results, reference character "A" indicates that the ratio of the catalyst coated length to the half of the length of the honeycomb structural body is not more than 2. Reference character "B" indicates that the ratio of the catalyst coated length to the half of the length of the honeycomb structural body is more than 2. The evaluation of the catalyst coated length is performed for the honeycomb structural body as the embodiments E6 and E7 only.

The catalyst coated length is calculated by using the equation of:

((Used weight by catalyst coating)×(Density of catalyst coating))/((GSA per unit volume of honeycomb structural body)).

When a honeycomb structural body is comprised of cells having a square shape, its GSA can be calculated on the basis of a thickness t of partition wall and a cell pitch p (see FIG. 5(a)). A distance x (=p−t) (see FIG. 5(a)) is the distance between sides of the partition walls which face together in each cell is calculated on the basis of the average thickness t and the cell pitch p of the partition walls. The distance x is a length of each side of the cell. Because the cell has a plane shape in a longitudinal direction when the cells of the honeycomb structural body have a square shape, it is possible to calculate a surface area S (=4 y L) of each cell when the length of the honeycomb structural body is L. The GSA of the honeycomb structural body can be calculated on the basis of the number of the cells. It is further possible to calculate the GSA per unit volume on the basis of the overall volume of the honeycomb structural body.

For example, it is possible to calculate the GSA (i.e. a geometrical surface area) per unit volume of the honeycomb structural body having hexagonal shaped cells on the basis of the thickness t of the partition wall and the cell pitch p (see FIG. 5(b)), similar to the cases previously described. The distance x (=p−t) (see FIG. 5(b)) between the sides which face to each other in each cell is calculated on the basis of the thickness t of the partition wall and the cell pitch p. A length y (=x/√3) of each of the sides is calculated by using the calculated distance x.

Because each cell in the honeycomb structural body has a simple plate shape along a longitudinal direction thereof, it is possible to calculate a surface area S (6yL) of each cell when character L designates a length of the honeycomb structural body. It is possible to calculate the overall GSA of the honeycomb structural body on the basis of the number of the cells. It is further possible to calculate the GSA per unit volume on the basis of the volume of the overall honeycomb structural body.

The evaluation of the thermal shock resistance is performed by heating the honeycomb structural body at a predetermined temperature (1050° C.) by using an electrical furnace. Next, the heated honeycomb structural body is taken out from the electric furnace, and normal temperature air flows into the central section of the honeycomb structural body. At this time, it is possible to adjust a temperature difference ($\Delta T$) between inside and outside of the honeycomb structural body to a desired temperature difference $\Delta T$ ($\Delta T$=50° C., 60° C., and 70° C.) by adjusting air pressure. The temperature difference $\Delta T$ between inside and outside is a difference in temperature between a thermocouple mounted to a central section in a radial cross section of the honeycomb structural body and a thermocouple mounted 10 mm radially outside from the central section.

When a generation rate Z of cracks is zero %, i.e. Z=0%, the judgment results about the thermal shock resistance using ten honeycomb structural bodies indicates reference character "A". When the generation rate of cracks is 0%<Z≤50%, the judgment results indicates reference character "B". When the generation rate is 50%<Z≤100%, the judgment results indicates reference character "C". The exemplary embodiment has evaluated the thermal shock resistance of the embodiment E8 and the comparison example C4.

TABLE 1

| | | Comparison examples | | | | Embodiments | | | | | | | |
|---|---|---|---|---|---|---|---|---|---|---|---|---|---|
| | | C1 | C2 | C3 | C4 | E1 | E2 | E3 | E4 | E5 | E6 | E7 | E8 |
| First cell density section | Hydraulic diameter φ2 (mm) | 1.27 | 1.04 | 1.04 | 1.04 | 1.04 | 1.04 | 1.04 | 1.04 | 1.04 | 1.04 | 1.04 | 1.04 |
| | Cell density (cells/cm²) | 62.0 | 93.0 | 93.0 | 93.0 | 93.0 | 93.0 | 93.0 | 93.0 | 93.0 | 93.0 | 93.0 | 93.0 |
| Second cell density section | Hydraulic diameter φ1 (mm) | — | — | 1.27 | 2.08 | 1.27 | 1.14 | 1.42 | 1.27 | 1.27 | 1.47 | 1.47 | 2.08 |
| | Cell density (cells/cm²) | — | — | 62.0 | 23.3 | 62.0 | 74.4 | 49.6 | 62.0 | 62.0 | 46.5 | 46.5 | 23.3 |
| Boundary section | Hydraulic diameter φ1 (mm) | — | — | 0.72 | 2.08 | 1.37 | 1.30 | 1.40 | 1.40 | 1.41 | 1.83 | 2.63 | 1.35 |
| Boundary wall | | None | None | Formed | None | None | None | None | None | None | None | None | None |
| Hydraulic diameter ratio φ1/φ2 | | — | — | 0.69 | 1.99 | 1.31 | 1.25 | 1.35 | 1.35 | 1.36 | 1.76 | 2.53 | 1.29 |
| Cell density ratio Ma/Mb | | 1 | 1 | 1.5 | 4 | 1.5 | 1.25 | 1.875 | 1.5 | 1.5 | 2 | 2 | 4 |
| Position r/R of boundary section | | — | — | 0.77 | 0.77 | 0.77 | 0.77 | 0.77 | 0.6 | 0.53 | 0.77 | 0.77 | 0.77 |
| Pressure loss ratio | | 0.85 | 1 | 0.92 | — | 0.9 | 0.93 | 0.87 | 0.9 | 0.89 | — | — | — |
| Emission ratio | | 1.13 | 1 | 0.7 | — | 0.6 | 0.72 | 0.78 | 0.57 | 0.59 | — | — | — |
| Cell clogging with catalyst | | — | — | B | — | A | A | A | A | A | — | — | — |
| Isostatic strength ratio | | — | — | 1 | — | 1 | — | — | — | — | 1.42 | — | — |
| Catalyst coating | | — | — | — | — | — | — | — | — | — | A | B | — |
| Thermal shock resistance | $\Delta T$ = 50° C. | — | — | — | A | — | — | — | — | — | — | — | A |
| | $\Delta T$ = 60° C. | — | — | — | B | — | — | — | — | — | — | — | A |
| | $\Delta T$ = 70° C. | — | — | — | C | — | — | — | — | — | — | — | A |

Further, Table 1 shows the evaluation results of the pressure loss, the exhaust gas purification performance, thermal shock resistance, etc. As can be understood from Table 1, because of having the boundary section and satisfying the relationship of φ1/φ2≥1.25, the honeycomb structural body according to the embodiments E1 to E5 has the pressure loss ratio of less than 1, and the emission ratio of less than 1. That is, when compared with the comparison example C2, the honeycomb structural body according to the embodiments E1 to E5 has the decreased pressure loss, and the increased exhaust gas purification performance. As a result, the honeycomb structural body according to the embodiments E1 to E5 can decrease the pressure loss and have a superior exhaust gas purification performance.

Further, as can be understood from table 1, the honeycomb structural body according to the embodiments E1 to E5 has the evaluation result "A" about the cell clogging with catalyst. On the other hand the honeycomb structural body according to the comparison example C3 has the evaluation result "B" about the cell clogging with catalyst because of having imperfect cells. FIG. 10 shows microscope photographs of an area around the boundary section of the honeycomb structural body according to the embodiment E1. FIG. 10(a) shows a state before catalyst was supported in the honeycomb structural body according to the embodiment E1. FIG. 10(b) shows a state after the catalyst was supported in the honeycomb structural body according to the embodiment E1. As can be understood from these figures, the honeycomb structural body according to the embodiment E1 has no cell clogging with catalyst in the area around the boundary section after the catalyst was supported in the honeycomb structural body. FIG. 11 shows microscope photographs of an area around the boundary section of the honeycomb structural body according to the comparison example C3. FIG. 11(a) shows a state before catalyst was supported in the honeycomb structural body according to the comparison example C3, and FIG. 11(b) shows a state after the catalyst was supported in the honeycomb structural body according to the comparison example C3. As can be understood from these figures, the honeycomb structural body according to the comparison example C3 causes cell clogging (designated by reference character P in FIG. 11(b)) in imperfect cells formed around the boundary section after the catalyst was supported in the honeycomb structural body.

Furthermore, as can be understood from Table 1, the honeycomb structural body according to the embodiment E6 has an isostatic strength which is higher than that of each of the comparison example C3 and the embodiment E1. This feature of the embodiment E6 is obtained by the structure in which the cell density ratio is 2:1, which is a ratio between the cell density of the inside cell density section (i.e. the first cell density section) formed inside of the boundary section and the cell density of the outside cell density section (i.e. the second cell density section) formed outside of the boundary section, and the cells arranged in the outside cell density section are tilted to the cells arranged in the inside cell density section by 45° in order to connect the lattice points (joints) of the partition walls arranged in both the inside cell density section and the outside cell density section formed at both sides of the boundary section.

Figure 12:
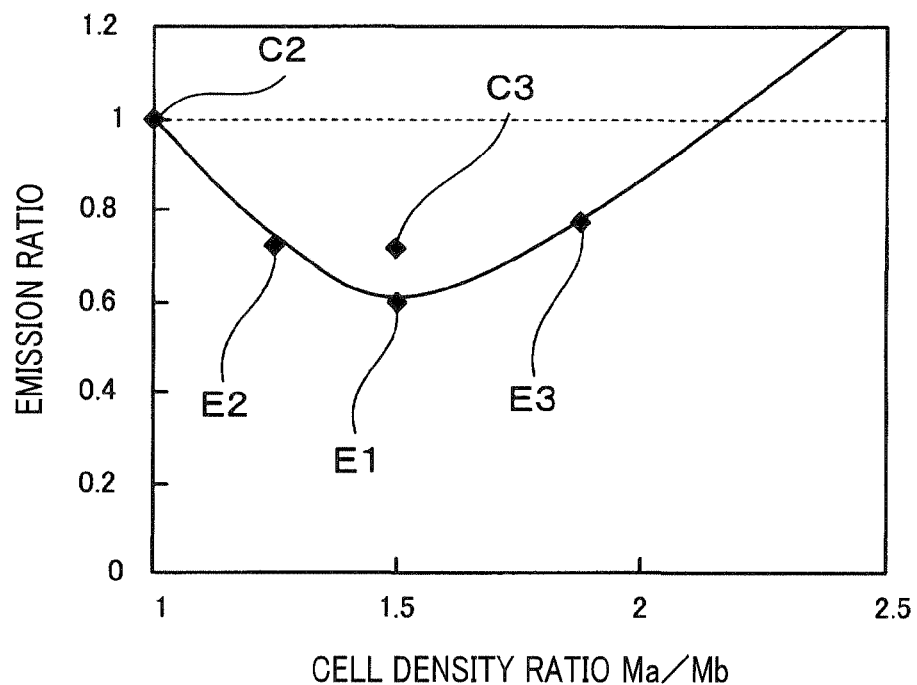
FIG. 12 is a graph showing a relationship between a cell density ratio Ma/Mb and an emission ratio of the honeycomb structural bodies according to the exemplary embodiment and the comparison example.

In addition, FIG. 12 shows the relationship between the cell density ratio Ma/Mb and the emission ratio on the basis of the evaluation results shown in Table 1. The emission ratio of each of the embodiments E1 to E3 and the comparison examples C2 and C3 is plotted in FIG. 12. In particular, the comparison example C2 has the cell density ratio Ma/Mb=1. As can be understood from FIG. 12, when the honeycomb structural body has the relationship of 1<Ma/Mb≤2.2 (in particular, having the value Ma/Mb within a range of 1.25 to 1.87), it is possible to further decrease the emission ratio (i.e. further decrease the emission amount) and increase the exhaust gas purification performance.

Figure 13:
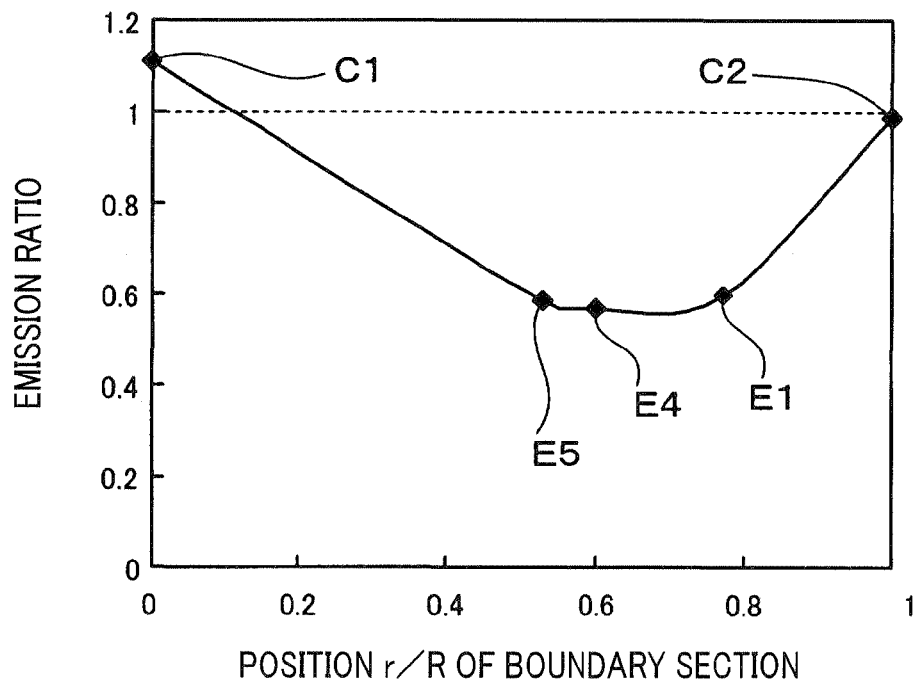
FIG. 13 is a graph showing a relationship between a location r/R of the boundary section and the cell density ratio Ma/Mb of the honeycomb structural bodies according to the exemplary embodiment and the comparison example.

Further, FIG. 13 shows the relationship between the location r/R of the boundary section and the emission ratio on the basis of the evaluation results shown in Table 1. The emission ratio of each of the embodiments E1, E4 and E5 and the comparison examples C1 and C2 is plotted in FIG. 13. Because the first cell density section in the comparison example C1 is different in cell density from the first cell density section of each of the embodiments E1, E4 and E5, the location r/R of the boundary section in the comparison example C1 is zero (r/R=0) as shown in FIG. 13. (Specifically, the location r/R of the boundary section in the comparison example C1 is designated with reference character "-" in Table 1.) In addition, because the first cell density section in the comparison example C2 has the same cell density of the first cell density section in each of the embodiments E1, E4 and E5, the location r/R of the boundary section in the comparison example C2 is designated by 1, i.e. r/R=1 in FIG. 13. (The location r/R of the boundary section in the comparison example C2 is designated with reference character "-" in Table 1.) As can be understood from the FIG. 13, because having the relationship of 0.16<r/R<1 (in particular, having the value r/R within a range of 0.5 to 0.9), the honeycomb structural body as the embodiments E1, E4 and E5 decreases the emission ratio as small as possible (further decreases the emission amount) and improves the exhaust gas purification performance.

Figure 14:
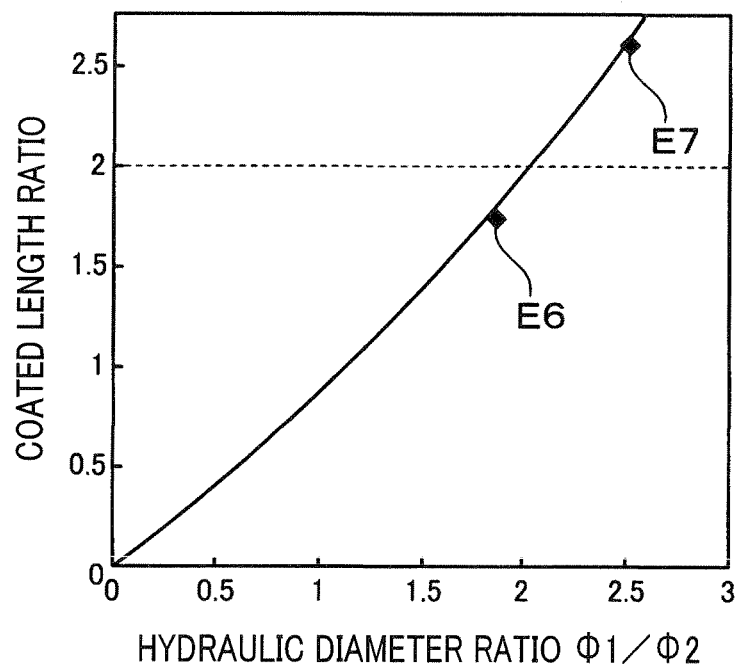
FIG. 14 is a graph showing a relationship between a ratio $\phi1/\phi2$ of average hydraulic diameters and a length of coated area in the honeycomb structural bodies according to the embodiments.

FIG. 14 shows the relationship between the hydraulic diameter ratio φ1/φ2 and the coated length on the basis of the evaluation results in table 1. The catalyst coated length ratio of each of the embodiments E6 and E7 is plotted in FIG. 14. As can be understood from FIG. 14, it decreases to not more than 2 of the catalyst coated length when the relationship of φ1/φ2≤2.02 is satisfied. That is, in order to perform the catalyst coating of the overall honeycomb structural body, after a half of the honeycomb structural body in an axial direction is coated by catalyst from one opening end surface of the honeycomb structural body, the honeycomb structural body is arranged in top-bottom inversion, and the remaining half of the honeycomb structural body is then coated with catalyst. In this case, it is possible to prevent catalyst from flowing out from the opposite opening section in the honeycomb structural body and unnecessary amount of catalyst from being consumed when the overall honeycomb structural body is coated by catalyst.

Still further, as can be understood from Table 1, the honeycomb structural body according to the embodiment E8 has the boundary cells in the boundary section having a shape of small rigidity (having a pentagonal shape) which is different in shape from the cells (having a square shape) in the cell density section. Accordingly, the honeycomb structural body according to the embodiment E8 has the evaluation result "A" about the thermal shock resistance in the conditions of ΔT=50° C., ΔT=60° C. and ΔT=70° C. That is, it is possible to improve the thermal shock resistance of the honeycomb structural body by adding flexibility to the boundary section (i.e. flexibility is given to a partial area in the honeycomb structural body). On the other hand, because the boundary cells formed in the boundary section and the cells formed in the cell density section have the same structure in the honeycomb structural body according to the comparison example C4, it is impossible to have the same effects of the honeycomb structural body according to the embodiment E8. The honeycomb structural body according to the comparison example C4 has the evaluation result "B" at the condition of ΔT=60° C.

and the evaluation result "C" at the condition of ΔT=70° C. about the thermal shock resistance.

REFERENCE SIGNS LIST

1 Honeycomb structural body,
11 Partition wall,
12 Cell,
14 Boundary section,
141 Boundary partition wall,
142 Boundary cell,
2 Cell density section, and
X Axial direction.

The invention claimed is:

1. A honeycomb structural body formed as a monolithic mold comprising partition walls arranged in a lattice shape and a plurality of cells surrounded by the partition walls, wherein
the honeycomb structural body comprises a plurality of cell density sections having a different cell density formed in a radial direction from a central side to an outer peripheral side,
a boundary section is formed between the cell density sections which are immediately adjacent,
the boundary section comprises boundary partition walls and a plurality of boundary cells having a polygonal shape,
the boundary partition walls connect the partition walls in the cell density sections formed adjacent to the boundary section,
the boundary cells having a polygonal shape are different in shape from the cells,
at least a part of the boundary cell is surrounded by the boundary partition walls, and
the honeycomb structural body satisfies a relationship of $\phi 1/\phi 2 \geq 1.25$, where $\phi 1$ indicates an average hydraulic diameter of the boundary cells formed in the boundary section, and $\phi 2$ indicates an average hydraulic diameter of the cells formed in the cell density section formed directly inside of the boundary section.

2. The honeycomb structural body according to claim 1, wherein the honeycomb structural body satisfies a relationship of $1.25 \leq \phi 1/\phi 2 \leq 2.02$.

3. The honeycomb structural body according to claim 1, wherein the honeycomb structural body satisfies a relationship of $1 < Ma/Mb \leq 2.2$, where reference character Ma indicates a maximum cell density of the cell density section, excepting the cell density section formed at an outermost side in the plural cell density sections, and reference character Mb indicates a minimum cell density of the cell density section in the plural cell density sections.

4. The honeycomb structural body according to claim 3, wherein the honeycomb structural body satisfies a relationship of $1.25 < Ma/Mb \leq 1.87$, where reference character Ma indicates a maximum cell density of the cell density section, excepting the cell density section formed at the outermost area in the plural cell density sections, and reference character Mb indicates a minimum cell density of the cell density section in the plural cell density sections.

5. The honeycomb structural body according to claim 1, wherein the honeycomb structural body satisfies a relationship of $0.16 < r/R < 1$, where reference character R indicates a radius of the honeycomb structural body, and reference character r indicates a radius of the boundary section which partitions the cell density section having the maximum cell density, excepting the outermost cell density section in the plural cell density sections, from the cell density section formed outwardly adjacent to the cell density section having the maximum cell density.

6. The honeycomb structural body according to claim 4, wherein the honeycomb structural body satisfies a relationship of $0.5 < r/R < 0.8$, where reference character R indicates a radius of the honeycomb structural body, reference character r indicates a radius of the boundary section which partitions the cell density section having the maximum cell density, excepting the outermost cell density section in the plural cell density sections, from the cell density section formed outwardly adjacent to the cell density section having the maximum cell density.

7. The honeycomb structural body according to claim 1, wherein the cell density section having a maximum cell density, excepting the outermost cell density section in the plural cell density sections, is arranged at an innermost side.

8. The honeycomb structural body according to claim 1, wherein the plural sections is comprised of an inside cell density section and an outside cell density section, wherein each of the inside cell density section and the outside cell density section comprises the partition walls arranged in a square lattice shape and square shaped cells surrounded by the partition walls,
a ratio of a cell density of the inside cell density section formed at the inner side to a cell density of the outside cell density section formed at the outer side is 2:1, and
the cells in the outside cell density section formed at the outer side have a tilt to the cells in the inside cell density section formed at the inside area by 45 degrees.

* * * * *

UNITED STATES PATENT AND TRADEMARK OFFICE
CERTIFICATE OF CORRECTION

PATENT NO. : 9,156,742 B2  
APPLICATION NO. : 14/375020  
DATED : October 13, 2015  
INVENTOR(S) : Hayashi et al.

Page 1 of 1

It is certified that error appears in the above-identified patent and that said Letters Patent is hereby corrected as shown below:

In the claims

At col. 20, line 26, please amend the following:

6. The honeycomb structural body according to claim [[4]]5,

Signed and Sealed this
Fifteenth Day of March, 2016

Michelle K. Lee
*Director of the United States Patent and Trademark Office*